United States Patent [19]

Hertz et al.

[11] 4,413,276

[45] Nov. 1, 1983

[54] OPTICAL SCANNER FOR COLOR FACSIMILE

[76] Inventors: Carl H. Hertz, Skolbanksvagen 8; Jan O. Nilsson, Stora Sodergatan 63B, both of Lund, Sweden

[21] Appl. No.: 321,825

[22] Filed: Nov. 16, 1981

[51] Int. Cl.³ .............................................. H04N 1/04
[52] U.S. Cl. ...................................... 358/75; 358/78
[58] Field of Search ........................... 358/75, 78, 901

[56] References Cited

U.S. PATENT DOCUMENTS

| | | | |
|---|---|---|---|
| 3,430,057 | 2/1969 | Genähr | 358/901 |
| 3,975,740 | 8/1976 | Distler | 358/75 |
| 4,015,077 | 3/1977 | Nelson | 358/901 |

FOREIGN PATENT DOCUMENTS

| | | | |
|---|---|---|---|
| 52-77513 | 6/1977 | Japan | 358/901 |
| 54-116820 | 9/1979 | Japan | 358/75 |
| 54-126416 | 10/1979 | Japan | 358/75 |

*Primary Examiner*—Michael A. Masinick
*Attorney, Agent, or Firm*—Richard J. Hammond

[57] ABSTRACT

An optical scanner generates facsimile signals. Each pixel of a scanned image is observed by separate fiber optic elements at different times. Each fiber optic collector directs the light through a color filter and the thus filtered light is detected. Separate color signals are then correlated to associate respective colors with each pixel of the scanned image.

8 Claims, 2 Drawing Figures

OPTICAL SCANNER FOR COLOR FACSIMILE

DESCRIPTION

Technical Field

This invention relates to an optical scanner for scanning an image to be reproduced and providing electrical outputs for separate colors. The scanner is particularly suited to optical scanners associated with ink jet printing systems.

BACKGROUND

In recent years, ink jet printers have been gaining acceptance as a means for reproducing an image which may include a picture as well as alphanumeric information. In such systems, one or more fine jets of ink are controlled by an electrical input. The controlled jets of ink are directed to a receiving medium such as paper on which the image is to be reproduced.

The control signals for the ink jets are obtained by optoelectric scanners which allow the conversion of a picture on a master into electrical analog signals, the magnitudes of which are proportional to the gray level of the picture elements, or pixels, in the picture. To this end, the picture is scanned linewise by an optoelectric device on a scanning head in raster fashion as with a television image.

The simplist type of scanner is the drum scanner in which the picture to be reproduced is mounted on a drum which is rotated at a high speed. A scanning head passes along the surface of the drum parallel to the drum axis at a slower speed. If a color image is to be reproduced in color, a color separation must be included in the scanning head to produce at least three analog signals, each corresponding to a specific color level of the particular pixel being observed at each instant. Typically, magenta, yellow and cyan color levels are obtained, and preferably a white level is also obtained.

To provide the separate color signals for each pixel of the image, the pixel is usually imaged onto a prism by a lens. The three color prism separates the original multicolor pixel image onto three separate pictures, each of which consists of one of the primary colors in the original picture. Such a method is commonly used in television cameras. A primary disadvantage to such an approach is that three color prisms which can properly separate the single pixel are very expensive.

The use of a light guide having three legs to direct light of different colors from a master to distinct photoelectric detectors has been suggested in U.S. Pat. No. 2,196,166 to J. W. Bryce. However, that patent was not for a facsimile system. The Bryce patent was concerned with detecting color coded spots, each spot comprising only one color to be detected. In that system, it was not necessary to Bryce to be concerned with obtaining precise relative intensity levels of separate colors from each single pixel. Further, the coded spots were spaced from each other so that the region of the master being observed at any instant did not have to be precisely defined.

In a facsimile system, small, side-by-side pixels, each comprising a range of colors, must be observed, and as many as three colors from each pixel must be separated such that the relative intensities of the colors found in the image pixel are preserved in the final electrical output. To utilize a light guide system such as that disclosed by Bryce in a facsimile system, the light guide would have to provide, in each leg, a representative sample of the light intensity observed by the combined light guide across the entire pixel.

An object of the present invention is to provide an optical scanner for obtaining accurate, multicolor signals from each well defined pixel of an image. A further object of this invention is to provide such a scanner which may be produced at a substantially lesser cost than the three color prisms conventionally used.

DISCLOSURE OF THE INVENTION

An optical scanner scans an image and provides separate color outputs from that image. The scanner includes a plurality of optical fiber light collectors, there being a separate optical fiber collector associated with each of the color outputs. Each optical fiber collects light from a discrete pixel area of the image which is distinct from the areas associated with the other collectors at each instant of scan. The light thus collected by each optical fiber is detected to provide an electrical output corresponding to the amount of light of a particular color. The fiber collectors are moved relative to the scanned image, and the electrical outputs for the respective colors are correlated as a function of the speed of relative movement between the collectors and the image. In that way, each collector observes a different pixel at any instant in time but the information collected is processed to assure that the separate color information for a given pixel is utilized properly to reproduce that pixel.

In a preferred form of the invention, the image to be reproduced is carried by a rapidly rotating drum, and the drum is scanned by an optical scanner having fiber optic pickups in line parallel to the direction of movement of the image on the drum. Preferably, a lens is provided between the image and the fiber optic collectors to focus respective pixels on those collectors. A color filter is provided in the optical path associated with each optical fiber. One end of the optical fibers associated with a photoelectric pickup may be stationary while the collecting end of the fiber optics may move on a scanner head. The simplest circuitry for correlating the electrical outputs is a set of analog delay circuits.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts through the different views. The drawings are not necessarily to scale, emphasis instead being placed upon illustrating the principles of the invention.

PREFERRED EMBODIMENT OF THE INVENTION

Figure 1:
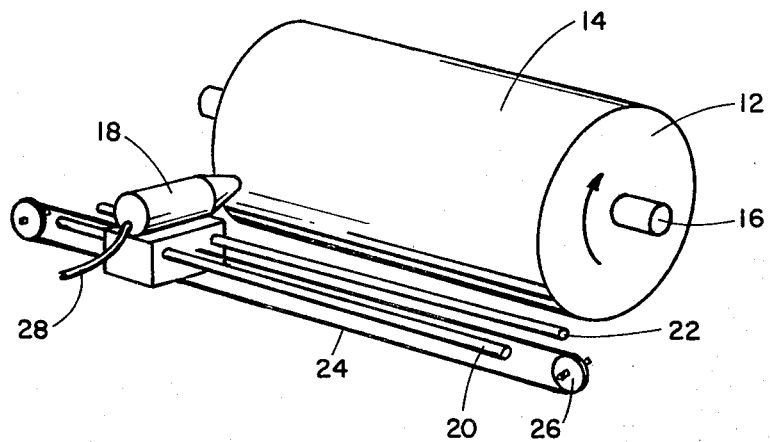
FIG. 1 is a perspective view of a drum scanner embodying this invention.

As shown in FIG. 1, the optical scanner includes a drum 12. The image to be reproduced is mounted to the surface 14 of the drum and the drum rotates rapidly about its axle 16 during scanning. A scanning head 18 is supported by fixed rods 20 and 22 and pulled slowly, continuously or incrementally, along those rods by a belt 24. The belt 24 may be driven, for example, by a motor drive through pulley 26. A flexible cable 28 from the scanning head 18 may be an electrical cable or a fiber optic cable as will be discussed below.

Figure 2:
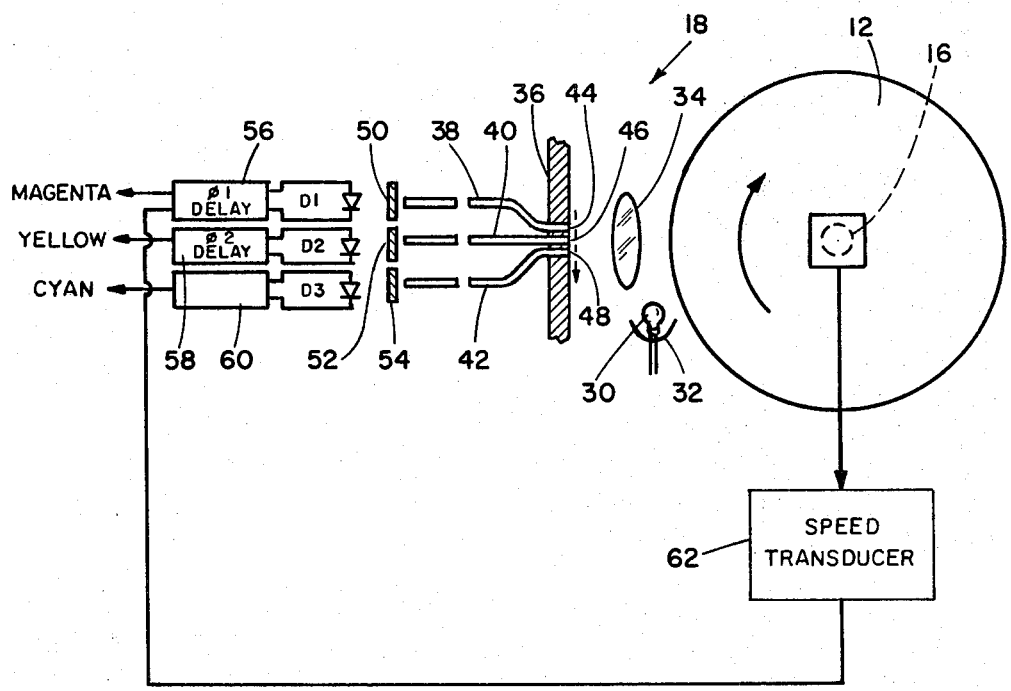
FIG. 2 is a schematic of the scanner of FIG. 1 showing three optical fiber collectors.

As shown in FIG. 2, the scanning head 18 includes an incandescent lamp 30 which illuminates the picture mounted on the drum 12 around the pixel being viewed by the scanning head. The light of the lamp 30 is concentrated on the focus of a lens 34 by a parabolic mirror 32. To minimize the heat radiation which strikes the picture on the drum, the mirror is preferably a "cold" mirror which does not reflect infrared radiation. Additional infrared filters may be provided in the optical system as well. Minimizing the infrared radiation is particularly important if semiconductor photodetectors are utilized in the system because such devices are normally very sensitive to such radiation.

Alternatively, the surface 14 of the drum 12 might be translucent with the illuminator positioned within the drum.

The illuminated region of the picture on drum 12 is projected onto the front face of a wall 36 by a lens 34. Three small holes are drilled close to each other in the wall along a line which is parallel to the scanning direction, that is parallel to the direction of movement of the image on the drum. The ends of optical fibers 38, 40 and 42 are positioned within those holes. The front faces 44, 46 and 48 of those optical fibers are finely ground such that they serve as light collectors. Each of those light collectors collects light from a discrete area of the image on drum 12 which is distinct from the areas associated with the other two light collectors. Thus, at any instant, each optical fiber is observing a separate pixel of the image.

The three optical fibers are spaced slightly from each other in order that they can be supported in respective holes in the wall 36. It should be realized that the fiber optic elements might be in actual contact with each other. The optical fibers themselves serve as apertures and thus determine the size of a pixel as well as the particular pixel being observed at any instant. Although three optical fiber collectors are shown, a fourth fiber would be a convenient collector of white light.

The light collected by each of the fibers is transmitted through respective color filters 50, 52 and 54. For example, filter 50 may be green, filter 52 may be blue and filter 54 may be red. The light which passes through those filters is detected by respective photodiodes D1, D2 and D3. Alternatively, photomultipliers might be utilized as the photoelectric detectors. The electrical output for the respective colors are processed through circuitry 56, 58 and 60 to provide the magenta, yellow and cyan electrical signals. By using suitable fibers, those signals represent the color separations required.

As the scanning head and drum move relative to each other, the picture on the drum is scanned linewise, pixel after pixel. Three analog electrical signals are produced and each represents variations of brightness level in one of the primary colors.

At any instant, the three optic fibers are viewing three distinct pixels. Thus, with scanning movement, the three color signals are slightly out of phase. To provide the color information for a single pixel, the three color outputs must be correlated as a function of the speed of relative movement between the optical fiber light collectors and the image on the drum 12.

In the system of FIG. 2, the three color signals are correlated by delaying two of the signals in the process circuitry 56 and 58. The circuit 56 provides the longest delay because a given pixel is viewed by the fiber 38 first with rapid rotation of the drum, in the direction indicated. A speed transducer 62 senses the actual speed of rotation of the drum and the delays of the magenta and yellow signals are adjusted accordingly.

The specific delay circuitry may be an analog delay line or by a digital delay after analog to digital conversion of the three signals.

A likely use of the optical scanner would be in combination with a microprocessor which controls the ink jet printer. In such a system, the color signals might be sequentially read into a digital memory and be stored in addresses associated with the various pixels. Subsequently, when it was desired to print out the information using an ink jet printer or any other apparatus, the information might be read out sequentially once again to control separate printing jets. In such an operation, the pixel signals may never be brought back into their proper relationship in time other than on the final reproduction. They would be correlated however by the memory addressing scheme.

The actual length of the optical fibers 38, 40 and 42 may be several feet long. Since the fibers are also quite flexible, the photoelectric pickup and filters need not be positioned on the moving scanning head 18. Rather, the photoelectric pickup might be mounted at a convenient stationary position. In that case, the connecting cable 28 shown in FIG. 1 would be a fiber optic cable. This approach is especially convenient if photomultipliers are used as the photoelectric devices due to the large size of such devices.

It is preferred that nonhomogeneous fibers, that is those with an outer cladding, be used; but the specific structure or material of the fibers is not critical.

Because the optical scanner described above is compact and inexpensive, it can be mounted on an ink jet printer assembly so that a single scanning head 18 can be utilized for both optical scanning to initially read a picture and for the subsequent ink jet printing of a reproduction. Also, separate reading and printing heads may be positioned in a scanning assembly so that one document might be read while a document mounted on a the same drum alongside the first is printed as a copy of the first.

While the invention has been particularly shown and described with reference to a preferred embodiment thereof, it will be understood by those skilled in the art that various changes in form and details may be made therein without departing from the spirit and scope of the invention as defined by the appended claims. For example, the scanning head described can be used in other types of scanners such as flat bed scanners. It is only important that the scanning head and the picture move relative to each other during the scanning procedure. Also, the optical fibers need not be positioned in line parallel to the direction of movement of the image. In fact, positioning of the fibers at a slight diagonal relative to that direction might account for slow continuous movement of the scanning head across the drum. Further, groups of optical fiber collectors might be provided for scanning several lines of raster at a time.

We claim:

1. An optical scanner for scanning an image and providing separate color outputs comprising:
   a plurality of optical fiber light collectors, there being a separate optical fiber collector associated with each of said color outputs, each light collector collecting light from a discrete area of the image which is distinct from areas associated with other light collectors at each instant of scan;

a lens for imaging the image onto the end faces of the optical fiber collectors;

means for detecting and providing an electrical output of the amount of light of a respective color collected by each optical fiber light collector;

means for causing relative movement between the optical fiber light collectors and the image; and means for correlating the electrical outputs as a function of the speed of relative movement between the optical fiber light collectors and the image to associate respective colors with each discrete area of the image.

2. An optical scanner as claimed in claim 1 wherein the image is carried by a drum.

3. An optical scanner as claimed in claim 2 wherein optical fiber light collectors associated with respective colors are positioned in line parallel to the direction of movement of the image on the drum, and the means for correlating the electrical outputs responds to the speed of the drum.

4. An optical scanner as claimed in claim 1 wherein the optical fiber light collectors are in line parallel to the direction of image movement, and the means for correlating responds to the speed of the image movement.

5. An optical scanner as claimed in claim 1, 3 or 4 wherein the means for correlating comprises means for delaying certain of the electrical output signals.

6. An optical scanner as claimed in claim 1 or 2 in which the means for detecting includes a color filter between the image and a photoelectric detector.

7. An optical scanner as claimed in claim 1 or 2 wherein the collecting end of each optical fiber collector is mounted for movement on a scanning head and the other end of each optical fiber is stationary adjacent to a stationary photoelectric detector.

8. An optical scanner as claimed in claim 1 or 2 further comprising an ink jet printer assembly.

* * * * *